(12) United States Patent
Sohn et al.

(10) Patent No.: US 11,815,447 B2
(45) Date of Patent: Nov. 14, 2023

(54) FEMTOSECOND LASER-BASED ULTRASONIC MEASURING APPARATUS FOR 3D PRINTING PROCESS AND 3D PRINTING SYSTEM HAVING THE SAME

(71) Applicant: Korea Advanced Institute of Science and Technology, Daejeon (KR)

(72) Inventors: Hoon Sohn, Daejeon (KR); Peipei Liu, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 295 days.

(21) Appl. No.: 17/114,647

(22) Filed: Dec. 8, 2020

(65) Prior Publication Data
US 2021/0199567 A1 Jul. 1, 2021

(30) Foreign Application Priority Data
Dec. 31, 2019 (KR) ........................ 10-2019-0179190

(51) Int. Cl.
*G01N 21/17* (2006.01)
*B33Y 30/00* (2015.01)
(Continued)

(52) U.S. Cl.
CPC ......... *G01N 21/1702* (2013.01); *B22F 12/90* (2021.01); *B33Y 30/00* (2014.12);
(Continued)

(58) Field of Classification Search
CPC .......... B22F 10/25; B22F 12/90; B22F 10/00; B22F 10/10; B22F 10/38; B22F 10/85;
(Continued)

(56) References Cited

U.S. PATENT DOCUMENTS 7,852,488 B2 * 12/2010 Devos ................ G01N 21/1702
356/630
11,484,945 B2 * 11/2022 Sohn ...................... B33Y 50/02
(Continued)

FOREIGN PATENT DOCUMENTS

JP 4991708 B2 8/2012
JP 2016/060063 A 4/2016

*Primary Examiner* — Violeta A Prieto
(74) *Attorney, Agent, or Firm* — DALY CROWLEY MOFFORD & DURKEE, LLP

(57) ABSTRACT

Disclosed are a femtosecond laser-based ultrasonic measuring apparatus for a 3D printing process, and a 3D printing system including the apparatus. The apparatus includes a femtosecond laser source for generating a femtosecond laser beam irradiated to inspect a state of a printing object formed by melting a base material by a printing laser beam irradiated from the laser source for 3D printing, a beam splitter for separating the femtosecond laser beam generated by the femtosecond laser source into a pump laser beam and a probe laser beam, an electric/acoustic optical modulator for modulating the pump laser beam, a time delay unit for delaying the probe laser beam, a photo detector for detecting the probe laser beam reflected by the printing object, and a lock-in amplifier for detect an amplitude and a phase of the output signal from the photo detector. The femtosecond laser source is disposed coaxially with a laser source for 3D printing.

13 Claims, 5 Drawing Sheets

(51) Int. Cl.
    *G01N 21/88*     (2006.01)
    *B33Y 50/02*     (2015.01)
    *B22F 12/90*     (2021.01)
    *B22F 10/25*     (2021.01)

(52) U.S. Cl.
    CPC .......... *B33Y 50/02* (2014.12); *G01N 21/8806* (2013.01); *B22F 10/25* (2021.01); *G01N 2201/067* (2013.01); *G01N 2201/06113* (2013.01)

(58) Field of Classification Search
    CPC ...... B22F 12/43; B22F 12/44; B22F 2202/01; B22F 2203/03; B22F 2999/00; B33Y 10/00; B33Y 30/00; B33Y 50/02; B33Y 40/00
    See application file for complete search history.

(56) References Cited

U.S. PATENT DOCUMENTS

| | | | | |
|---|---|---|---|---|
| 11,628,502 | B2* | 4/2023 | Sohn | B22F 10/25 |
| | | | | 700/119 |
| 2008/0315131 | A1* | 12/2008 | Devos | G01N 21/1702 |
| | | | | 250/503.1 |
| 2017/0266727 | A1* | 9/2017 | Nishino | G01N 21/1702 |
| 2021/0197279 | A1* | 7/2021 | Sohn | B22F 10/25 |
| 2021/0197283 | A1* | 7/2021 | Sohn | B22F 10/368 |
| 2021/0197287 | A1* | 7/2021 | Sohn | B33Y 50/02 |
| 2022/0266390 | A1* | 8/2022 | Neogi | B29C 64/393 |
| 2023/0051394 | A1* | 2/2023 | Sohn | B22F 10/25 |

* cited by examiner

FEMTOSECOND LASER-BASED ULTRASONIC MEASURING APPARATUS FOR 3D PRINTING PROCESS AND 3D PRINTING SYSTEM HAVING THE SAME

CROSS-REFERENCE TO RELATED APPLICATION

This U.S. non-provisional application claims priority under 35 U.S.C. § 119 from Korean Patent Application No. 10-2019-0179190, filed on Dec. 31, 2019 in the Korean Intellectual Property Office (KIPO), the disclosure of which is hereby incorporated by reference in its entirety.

BACKGROUND

1. Technical Field

The present disclosure relates to a three-dimensional (3D) printing, and more particularly, to a femtosecond laser-based ultrasonic measuring apparatus for estimating physical properties of a printed object and detecting defects of the object during a 3D printing process, and a 3D printing system having the same.

2. Description of the Related Art

The 3D printing is known as a manufacturing technology for producing a 3D object. For the 3D printing of the 3D object, it is processed in a way that stacks layer by layer based on the 3D model data processing information. The 3D printing technology has advantages that facilitates realization of a complex shape, a shape formed inside a product, etc. Due to these advantages, the 3D printing technology is in the spotlight as a high value-added technology that makes it easy to manufacture various products such as various industrial parts and medical materials.

The 3D printing process can be performed by dividing the shape of a 3D product into a number of 2D cross sections having a uniform or variable thickness, and forming the 2D cross sections to be stacked one by one. There are several known 3D printing methods such as a material extrusion method, a material jetting method, a binder jetting method, a sheet lamination method, a vat photo-polymerization method, a powder bed fusion method, a directed energy deposition (DED) method, etc. Among them, the DED method is a method of applying laser energy to metal powder or wire material to be melted and fused, and is widely used because of its advantages that it can use inexpensive commercial materials compared to other methods, form a lamination on existing 3D shapes, and have superior mechanical properties compared to other methods.

In the 3D printing according to the DED method, a molten pool is formed when a laser beam irradiated from a laser source is irradiated to the substrate, and metal powder is supplied onto the molten pool to form a lamination. Currently, the measurement technology that can be applied to the 3D printing process is limited. Due to poor environments inside a build chamber for the 3D printing and limitations in data collection and processing speed, only basic sensing technologies have been applied to the 3D printing process to date. Therefore, it is required that a new measurement technology of high-speed and high-resolution should be developed for high-fidelity online monitoring and non-destructive evaluation (NDE).

SUMMARY

The present disclosure has been made under the recognition of the above-mentioned problems of the conventional art. Some embodiments of the present disclosure are to provide a femtosecond laser-based ultrasonic measurement apparatus for the 3D printing process that can perform real-time measurements with high spatial measurement resolution for product defect detection and material property estimation during the 3D printing process, and a 3D printing system including the same.

In one aspect, the present inventive concepts are directed to a femtosecond laser-based ultrasonic measuring apparatus for a 3D printing process. The femtosecond laser-based ultrasonic measuring apparatus includes a femtosecond laser source, a beam splitter, an electric/acoustic optical modulator, a time delay unit, a photo detector, and a lock-in amplifier. The femtosecond laser source is disposed coaxially with a laser source for 3D printing, and is configured to generate a femtosecond laser beam irradiated to inspect a state of a printing object formed by melting a base material by a printing laser beam irradiated from the laser source for 3D printing. The beam splitter is configured to separate the femtosecond laser beam generated by the femtosecond laser source into a pump laser beam and a probe laser beam. The electric/acoustic optical modulator is configured to modulate the pump laser beam. The time delay unit is configured to delay the probe laser beam. The photo detector is configured to detect the probe laser beam reflected by the printing object. The lock-in amplifier includes a demodulator for demodulating an output signal from the photo detector at a modulation frequency, and a low pass filter for passing a low frequency band of the demodulated signal, and is configured to detect an amplitude and a phase of the output signal from the photo detector.

In an embodiment of the present disclosure, the pump laser beam and the probe laser beam may be irradiated to be incident on a solidified area spaced apart from the printing laser beam by a predetermined distance.

In an embodiment, the pump laser beam and the probe laser beam may be irradiated to be incident on a same spot of the printing object.

In an embodiment, the pump laser beam may be irradiated to be incident on a same position as the printing laser beam, and the probe laser beam may be irradiated to be incident on a solidified area spaced apart from the printing laser beam by a predetermined distance.

In an embodiment, the probe laser beam may be irradiated to be incident on a solidified area spaced apart from the printing laser beam by a predetermined distance, and the printing laser beam may be used as the pump laser beam.

In an embodiment, the time delay unit may be configured to adjust a length of an optical path of the probe laser beam.

In an embodiment, a minimum displacement of the length may be 0.1 μm.

In an embodiment, the femtosecond laser source may generate the femtosecond laser beam at a frequency of 40 MHz.

In an embodiment, the detected amplitude and phase may be used for estimating a physical property of the printing object and detecting a defect of the printing object.

In an embodiment, the physical property may include at least any one of Young's modulus and residual stress, and the defect may include at least any one of crack, void, and porosity.

In an embodiment, the electric/acoustic optical modulator may pulse-peak the laser beam of the femtosecond laser source at a modulation frequency.

In an embodiment, the pump laser beam, the probe laser beam, and the printing laser beam may have different wavelengths.

In an embodiment, the printing laser beam may have a wavelength band of 1.07 μm or less.

In an embodiment, the probe laser beam may have a wavelength band of 515 nm or less.

In an embodiment, the pump laser beam may have a wavelength band of 257 nm or less.

In another aspect, the present inventive concepts are directed to a 3D printing system that includes a 3D printing laser source, a base material source, a femtosecond laser source, a beam splitter, an electric/acoustic optical modulator, a time delay unit, a photo detector, and a lock-in amplifier. The 3D printing laser source is configured to form a molten pool on a printing object by irradiating a laser beam to melt a base material supplied to the printing object. The base material source is configured to supply the base material to the printing object. The femtosecond laser source is disposed coaxially with the 3D printing laser source, and is configured to generate a laser beam irradiated to inspect a state of the printing object. The beam splitter is configured to separate the laser beam generated by the femtosecond laser source into a pump laser beam and a probe laser beam. The electro/acoustic optical modulator is configured to modulate the pump laser beam. The time delay unit is configured to delay the probe laser beam. The photo detector is configured to detect the probe laser beam reflected by the printing object. The lock-in amplifier includes a demodulator for demodulating an output signal from the photo detector at a modulation frequency, and a low pass filter for passing a low frequency band of the demodulated signal, and is configured to detect an amplitude and a phase of the output signal from the photo detector.

In an embodiment, the pump laser beam and the probe laser beam may be irradiated to be incident on a solidified area spaced apart from the printing laser beam by a predetermined distance.

In an embodiment, the pump laser beam, the probe laser beam, and the printing laser beam may have different wavelengths.

In an embodiment, the 3D printing system may further include a first reflection mirror configured to reflect the printing laser beam from the 3D printing laser source toward the femtosecond laser source; and a second reflection mirror configured to reflect the reflected printing laser beam toward the printing object.

In an embodiment, the detected amplitude and phase may be used for estimating physical properties of the printing object and detecting defects of the printing object.

According to embodiments of the present disclosure, measurements with high spatial measurement resolution for estimating product properties and detecting defects of the printing object can be performed in real-time by using a femtosecond laser. Accordingly, it is possible to improve the control precision and quality of the 3D printing process.

In addition, according to the embodiments of the present disclosure, the defect detection and physical property estimation using the femtosecond laser can be performed on-line during the 3D printing process with a high spatial measurement resolution. Therefore, when there occurs a defect of the printing object during the 3D printing process, early detection of the defect and disposal of the defective printing product is possible. In addition, it is possible to provide real-time feedback control to improve the quality of 3D printing products, thus improving the efficiency of the 3D printing process.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
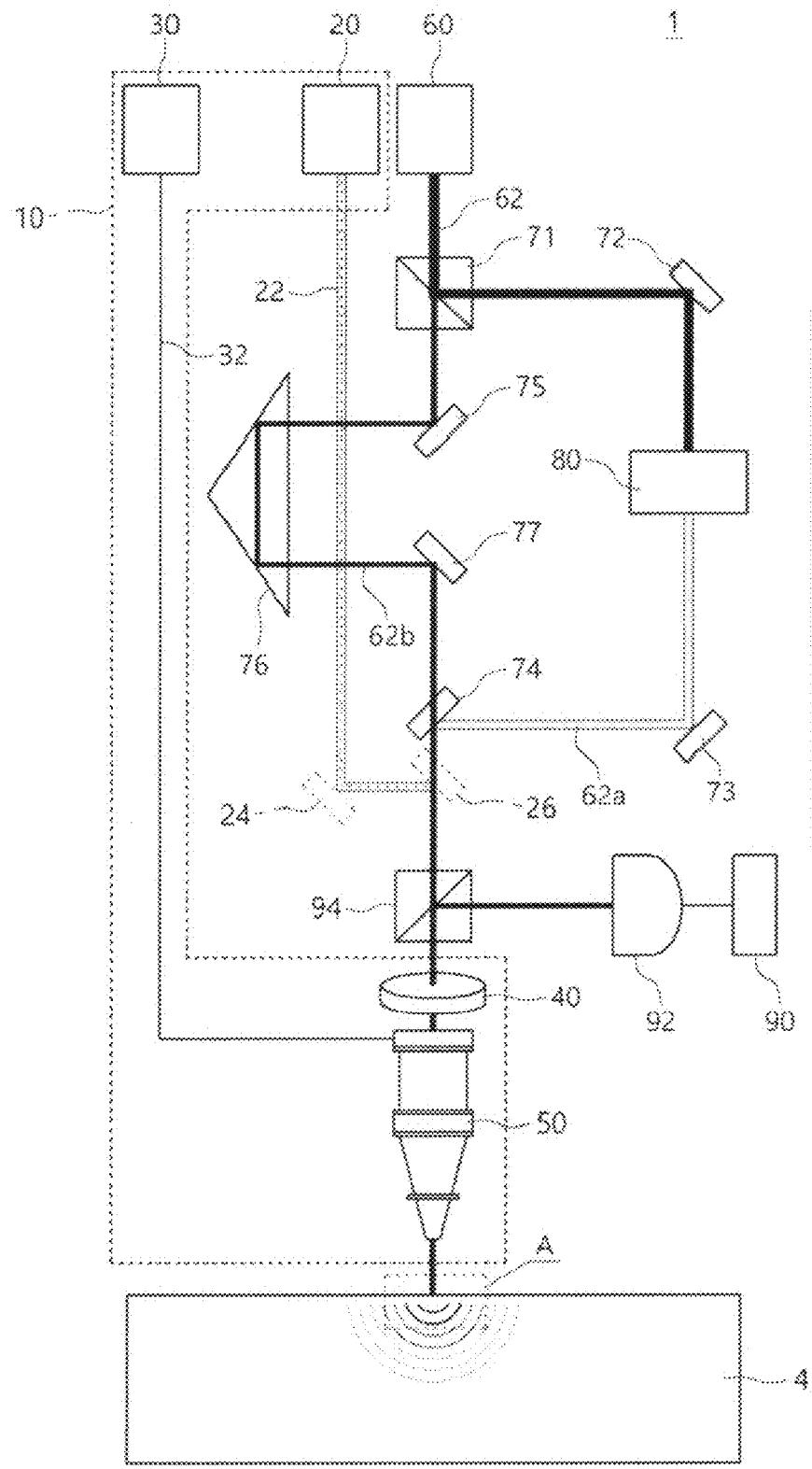
FIG. 1 is a configuration diagram of a 3D printing system according to an example embodiment of the present disclosure.

Hereinafter, embodiments of the present disclosure will be described in detail with reference to the accompanying drawings. The present disclosure may be implemented in various different forms, and is not limited to the embodiments described herein. In the drawings, parts irrelevant to the description are omitted in order to clearly describe the present disclosure, and the same reference numerals are assigned to the same or similar elements throughout the specification.

Figure 2:
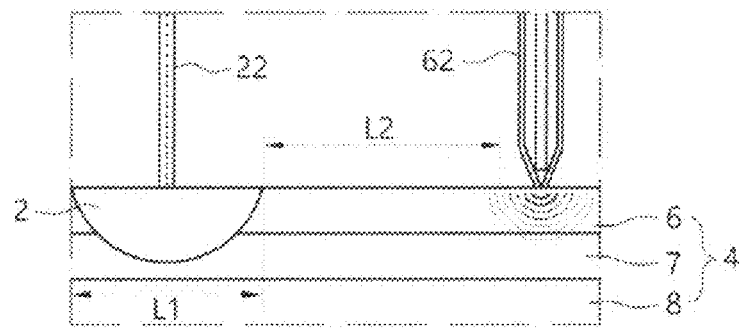
FIG. 2 is an enlarged view of part 'A' shown in FIG. 1.

FIG. 1 illustrates a configuration of the 3D printing system according to an example embodiment of the present disclosure, and FIG. 2 is an enlarged view of part 'A' in FIG. 1.

A 3D printing system 1 according to an example embodiment of the present disclosure may be a system for forming a 3D object by melting a base material using a laser. The 3D printing system 1 may include an apparatus for inspecting the printing quality of a printing object 4 using a femtosecond laser beam having a high spatial measurement resolution during the 3D printing process.

Referring to FIG. 1, the 3D printing system 1 may include a laser source 20, a base material source 30, a focus lens 40, a nozzle 50, a femtosecond laser source 60, a first beam splitter 71, a time delay unit 76, an electric/acoustic optical modulator 80, a second beam splitter 94, a photo detector 92, and a lock-in amplifier 90.

Here, as an example, the 3D printing system 1 may be a DED type 3D printing system capable of forming a 3D object by melting metal powder with a laser. The laser source 20, the base material source 30, the focus lens 40, and the nozzle 50 may construct a general DED type 3D printer 10. However, the 3D printer 10 that can be applied to the 3D printing system 1 according to an embodiment of the present disclosure is not limited to the DED type. Any 3D printer capable of forming a molten pool of metal can be applied as a part to the 3D printing system 1 according to the present disclosure.

In addition, the 3D printing system 1 may include the femtosecond laser source 60 provided coaxially to the DED type 3D printer 10. That is, the femtosecond laser source 60 may be disposed coaxially with the laser source 20. Here, the coaxial disposition means that related components are arranged so that a plurality of laser beams shares the same optical path. For example, the coaxial disposition means that the optical path is shared by separating and transmitting the laser beam by a beam splitter, a dichroic mirror, or a filter. Accordingly, it is possible to continuously measure an ultrasonic wave with respect to the printing object 4 without controlling the positions of the laser source 20 and the femtosecond laser source 60.

In addition, the femtosecond laser source 60, the first beam splitter 71, the time delay unit 76, the electric/acoustic optical modulator 80, the photo detector 92, and the amplifier 90 may form a femtosecond laser-based ultrasonic measuring apparatus capable of measuring a printing object using a femtosecond laser beam while the 3D printing process according to the embodiment of the present disclosure is performed. In this case, the femtosecond laser-based ultrasonic measuring apparatus for the 3D printing process may include an optical means for forming an optical path. Accordingly, the 3D printing system 1 may include the 3D printer 10 and the femtosecond laser-based ultrasonic measuring apparatus.

The laser source 20 may generate a printing laser beam 22 onto the printing object 4. The printing laser beam 22 irradiated from the laser source 20 may pass through the first and second reflection mirrors 24 and 26 and the focus lens 40 in turn and is irradiated onto the printing object 4. At this time, the laser beam 22 irradiated from the laser source 20 may pass through the nozzle 50 for supplying the base material while being irradiated to the molten pool 2. Here, the laser beam 22 of the laser source 20 may have a wavelength band of 1.07 μm or less.

In FIG. 1, the laser source 20 may be disposed spatially apart from the femtosecond laser source 60. Since the laser source 20 is not disposed in a straight line with the nozzle 50, optical means such as a first reflection mirror 24 and a second reflection mirror 26 may be provided in order for the laser source 20 and the femtosecond laser source 60 to be coaxially disposed.

The first reflection mirror 24 may reflect the printing laser beam 22 from the laser source 20 toward the femtosecond laser source 60. In addition, the second reflection mirror 26 may reflect the printing laser beam 22 reflected by the first reflection mirror 24 toward an object to be printed (a printing object) 4.

However, the optical means for forming the optical path of the printing laser beam 22 is not limited thereto, and may be changed according to the positions of the laser source 20 and the femtosecond laser source 60 or the optical path thereof.

The base material supplied from the base material source 30 may be supplied to the nozzle 50 in the form of, for example, metal powder or metal wire through a separate supply pipe 32. To supply the base material to the printing object 4, a base material movement path formed in the nozzle 50 may be in parallel to or obliquely to the path through which the printing laser beam 22 passes. The base material supplied to the printing object 4 is melted by the laser source 20 to form the molten pool 2 on the printing object 4.

The femtosecond laser source 60 may generate a femtosecond laser beam 62 to inspect a state of the printing object 4. As an example, the femtosecond laser source 60 may generate the femtosecond laser beam 62 with a repetition frequency of 40 MHz. In this case, the femtosecond laser beam 62 may have a wavelength different from that of the printing laser beam 22. For example, the femtosecond laser beam 62 may have a wavelength band of 515 nm or less.

Here, the femtosecond laser beam 62 may be used for estimating physical properties of the printing object 4 and detecting defects of the printing object 4. Physical properties of the printing object 4 may include Young's modulus and residual stress. In addition, defects of the printing object 4 may include cracks, voids, and porosity. In this case, physical property estimation and defect detection may be performed based on a pulse-echo technique or a pitch-catch technique, as described later.

In addition, ultrasonic measurement with the femtosecond laser beam 62 may be performed using a pump-probe technique. To this end, the femtosecond laser beam 62 may be divided into a pump laser beam 62a and a probe laser beam 62b. In practice, the pump laser beam 62a may be defined as an output of the electric/acoustic optical modulator 80, and the probe laser beam 62b may be defined as an output of the time delay unit 76. At this time, the pump laser beam 62a may excite the printing object 4. The probe laser beam 62b may be used for ultrasonic measurement to inspect the state of the printing object 4 using a time delay of the probe laser beam 62b with the pump laser beam 62a.

Here, the pump laser beam 62a may generate ultrasonic waves at the level of THz at an excitation point. Through this, it is possible to inspect minute defects at the level of nm. For example, when the printing object 4 is a steel material, a wavelength of the elastic wave generated from the steel material may be 10 nm according to the following equation.

$$\lambda = \frac{v}{f} \approx \frac{5000 \text{ m/s}}{0.5 \text{ THz}} = 10 \text{ nm} \tag{1}$$

The first beam splitter 71 may be disposed on the path of the femtosecond laser beam 62 irradiated from the femtosecond laser source 60. The first beam splitter 71 may separate the femtosecond laser beam 62 generated by the femtosecond laser source 60 into the pump laser beam 62a and the probe laser beam 62b. In this case, the femtosecond laser beam 62 transmitted through the first beam splitter 71 may be a probe laser beam 62b, and the beam separated by the first beam splitter 71 may be the pump laser beam 62a.

However, the optical path configuration of the pump laser beam 62a and the probe laser beam 62b is not limited thereto, and may be configured in various ways. For example, the optical paths of the pump laser beam 62a and the probe laser beam 62b may be configured opposite to that of FIG. 1.

To configure the optical path of the pump laser beam 62a, a third reflection mirror 72, a fourth reflection mirror 73, and a fifth reflection mirror 74 may be provided. Here, the third reflection mirror 72 may be disposed between the first beam splitter 71 and the electric/acoustic optical modulator 80. In this case, the third reflection mirror 72 may reflect the femtosecond laser beam 62 separated by the first beam splitter 71 toward the electric/acoustic optical modulator 80.

The fourth reflection mirror 73 may be disposed between the electric/acoustic optical modulator 80 and the fifth reflection mirror 74. In this case, the fourth reflection mirror 73 may reflect the pump laser beam 62a output from the electric/acoustic optical modulator 80 toward the fifth reflection mirror 74.

The fifth reflection mirror 74 may be disposed between the fourth reflection mirror 73 and the second beam splitter 94. In this case, the fifth reflection mirror 74 may reflect the reflected pump laser beam 62a toward the second beam splitter 94 or the nozzle 50. In addition, the second reflection mirror 26 may allow the pump laser beam 62a to transmit itself.

Accordingly, the pump laser beam 62a separated by the first beam splitter 71 may be coaxially configured with the probe laser beam 62b and the printing laser beam 22.

However, the optical means for forming the optical path of the pump laser beam 62a is not limited thereto, and may be changed according to the positions of the laser source 20 and the femtosecond laser source 60 or the optical path thereof.

The time delay unit 76 may delay the probe laser beam 62b that has passed through the first beam splitter 71. In this case, the time delay unit 76 may adjust the length of the optical path of the probe laser beam 62b. That is, the time delay unit 76 may include a plurality of reflection mirrors to adjust the length of the optical path.

Here, a high sample frequency may be obtained by controlling the time delay between the pump laser beam 62a and the probe laser beam 62b. For example, the minimum displacement of the optical path length may be 0.1 μm. This delay corresponds to a sample frequency of 3 PHz according to the following equation. As a result, it is possible to measure in real time with high resolution, and thus control precision and quality of the 3D printing process can be improved.

$$f_{s,max} = \frac{v_{light}}{\Delta d_{min}} \approx \frac{3 \times 10^8 \text{ m/s}}{0.1 \text{ μm}} = 3 \text{ PHz} \tag{2}$$

The time delay unit 76 may delay the femtosecond laser beam 62 to form a substantial probe laser beam 62b. Here, the probe laser beam 62b may have the same wavelength as the femtosecond laser beam 62. As an example, the probe laser beam 62b may have a wavelength band of 515 nm or less.

At this time, in order to form an optical path of the probe laser beam 62b and to adjust the optical path length of the time delay unit 76, a sixth reflection mirror 75 and a seventh reflection mirror 77 may be provided. The sixth reflection mirror 75 may be disposed between the first beam splitter 71 and the time delay unit 76. In this case, the sixth reflection mirror 75 may reflect the femtosecond laser beam 62 through the first beam splitter 71 toward the time delay unit 76.

The seventh reflection mirror 77 may be disposed between the time delay unit 76 and the nozzle 50. In this case, the seventh reflection mirror 77 may reflect the probe laser beam 62b, which is the time-delayed femtosecond laser beam 62, output from the time delay unit 76 toward the second beam splitter 94 or the nozzle 50. In addition, each of the second reflection mirror 26 and the fifth reflection mirror 74 may allow the probe laser beam 62b to transmit itself.

Accordingly, the probe laser beam 62b separated by the first beam splitter 71 may be formed coaxially with the pump laser beam 62a and the printing laser beam 22.

However, the optical means for forming the optical path of the probe laser beam 62b is not limited thereto, and may be changed according to the positions of the laser source 20 and the femtosecond laser source 60 or the optical paths thereof.

The electric/acoustic optical modulator 80 may modulate the pump laser beam 62a separated from the femtosecond laser beam 62 by the first beam splitter 71. Here, the electrical/acoustic optical modulator 80 may be an acousto-optic modulator (AOM) or an electro-optic modulator (EOM).

For example, the electric/acoustic optical modulator 80 may perform pulse picking of the femtosecond laser beam 62 from the femtosecond laser source 60 at a modulation frequency $f_0$.

The electro/acoustic optical modulator 80 may modulate the femtosecond laser beam 62 into a substantial pump laser beam 62a. Here, the pump laser beam 62a may have a wavelength different from that of the printing laser beam 22. For example, the pump laser beam 62a may have a wavelength band of 257 nm or less.

The second beam splitter 94 may be disposed on the coaxial path of the printing laser beam 22, the pump laser beam 62a, and the probe laser beam 62b. The second beam splitter 94 may allow the printing laser beam 22, the pump laser beam 62a, and the probe laser beam 62b to pass through the nozzle 50.

As shown in FIG. 2, the printing laser beam 22 and the femtosecond laser beam 62 may be separated by at least a certain distance L2 to be irradiated onto the printing object 4. Here, the femtosecond laser beam 62 may include the pump laser beam 62a and the probe laser beam 62b. Optionally, the femtosecond laser beam 62 may include only the probe laser beam 62b, as described later with reference to FIGS. 4 and 5.

At this time, the molten pool 2 may be formed on the printing object 4 to be printed by the laser beam 22 for printing. The molten pool 2 may be formed with a constant width L1 according to the energy of the printing laser beam 22. For example, the width L1 of the molten pool 2 may be about 500 μm.

In addition, the femtosecond laser beam 62 may be irradiated to the solidified area of the molten printing object 4 by the printing laser beam 22. That is, the distance L2 between the printing laser beam 22 and the femtosecond laser beam 62 may be a distance from the molten pool 2 formed by the printing laser beam 22 to the solidified area. For example, the distance L2 may be about 1.5 mm to 2.5 mm.

In this case, the printing object 4 may be formed as a three-dimensional object by stacking a plurality of layers. In FIG. 2 for describing this example embodiment, it is illustrated that the printing object 4 is formed of a first layer 6, a second layer 7 and a third layer 8, and the molten pool 2 is formed in the first layer 6 and the second layer 7.

The probe laser beam 62b may be incident on and then reflected from the printing object 4. The second beam splitter 94 may reflect the probe laser beam 62b reflected from the printing object 4 toward the photo detector 92 in order to inspect the state of the printing object 4.

The photo detector 92 may detect the probe laser beam 62b reflected by the printing object 4. That is, the photo detector 92 may convert the received probe laser beam 62b into an electric signal. As an example, the photo detector 92 may be a photodiode.

The lock-in amplifier 90 may detect amplitude and phase of the output signal from the photo detector 92. For this, the lock-in amplifier 90 may remove noises included in the output signal. Here, the detected amplitude and phase may be used for estimating the physical properties of the printing object 4 and detecting defects of the printing object 4.

Figure 3:
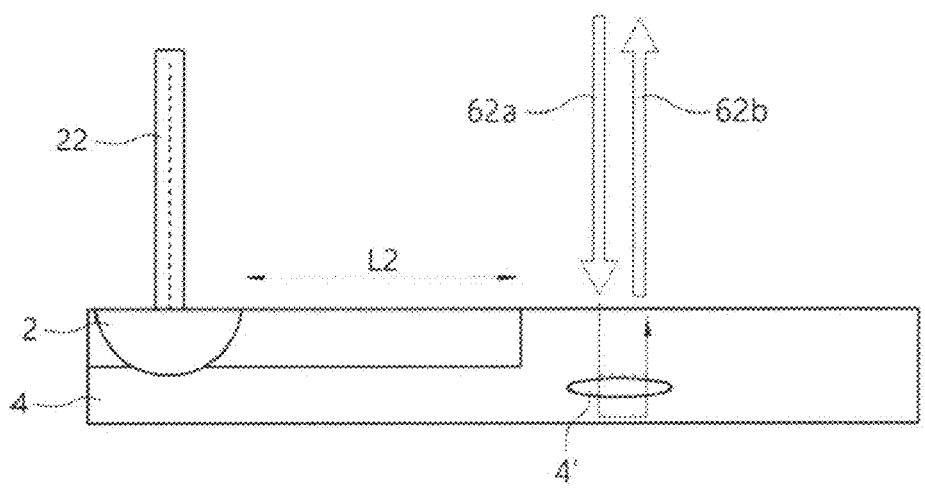
FIG. 3 is a diagram showing an example configuration of a printing laser beam and a femtosecond laser beam when a pulse-echo technique is used in the 3D printing system according to an example embodiment of the present disclosure.

FIG. 3 is a diagram illustrating a configuration of the printing laser beam and the femtosecond laser beam when a pulse-echo technique is used in the 3D printing system according to an example embodiment of the present disclosure.

The 3D printing system 1 may use a pulse-echo technique for estimating the physical properties of the object 4 and detecting defects thereof. For this, the pump laser beam 62a and the probe laser beam 62b may be irradiated onto a spot of the printing object 4, where the spot may be spaced apart from the printing laser beam 22 by a predetermined distance L2. That is, the pump laser beam 62a and the probe laser beam 62b may be irradiated to the same spot of the object 4 to be printed. As an example, the pump laser beam 62a and the probe laser beam 62b may be irradiated within the solidified area of the printing object 4.

The pump laser beam 62a may be a beam for generating ultrasonic waves by causing the printing object 4 to be excited. The probe laser beam 62b may be a beam for measuring ultrasonic waves to inspect the state of the printing object 4. For example, a defect such as a void 4' existing inside the printing object 4 may be detected by a difference in response time of the probe laser beam 62b.

Figure 4:
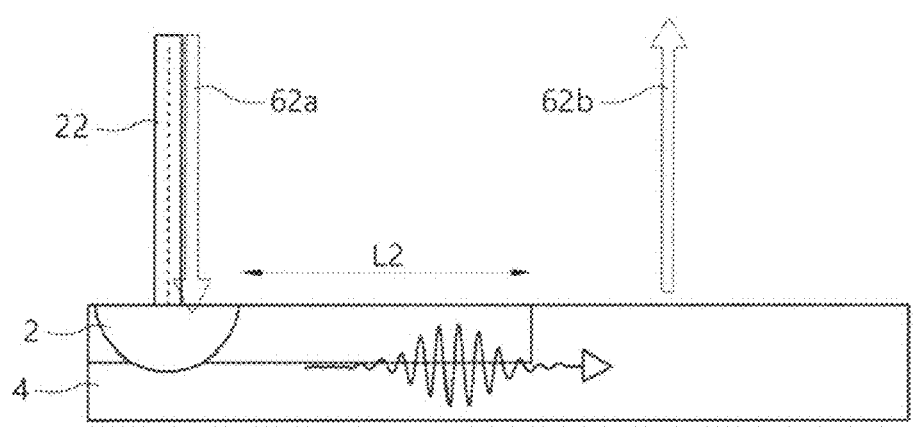
FIG. 4 is a diagram illustrating other example configuration of the printing laser beam and the femtosecond laser beam when a pitch-catch technique is used in the 3D printing system according to an example embodiment of the present disclosure.

FIG. 4 is a diagram illustrating an example configuration of the printing laser beam and the femtosecond laser beam when a pitch-catch technique is used in the 3D printing system according to an embodiment of the present disclosure.

The 3D printing system 1 may use the pitch-catch technique for estimating physical properties of the printing object 4 and detecting defects thereof. For this, the pump laser beam 62a may be irradiated at the same position as the printing laser beam 22. The probe laser beam 62b may be irradiated onto a spot of the printing object 4 which is spaced apart from the printing laser beam 22 or the pump laser beam 62a by a predetermined distance L2. As an example, the probe laser beam 62b may be irradiated onto the solidified area of the printing object 4.

The pump laser beam 62a may be for generating ultrasonic waves by causing the printing object 4 to be excited. The probe laser beam 62b may be for measuring ultrasonic waves to inspect the state of the printing object 4.

Figure 5:
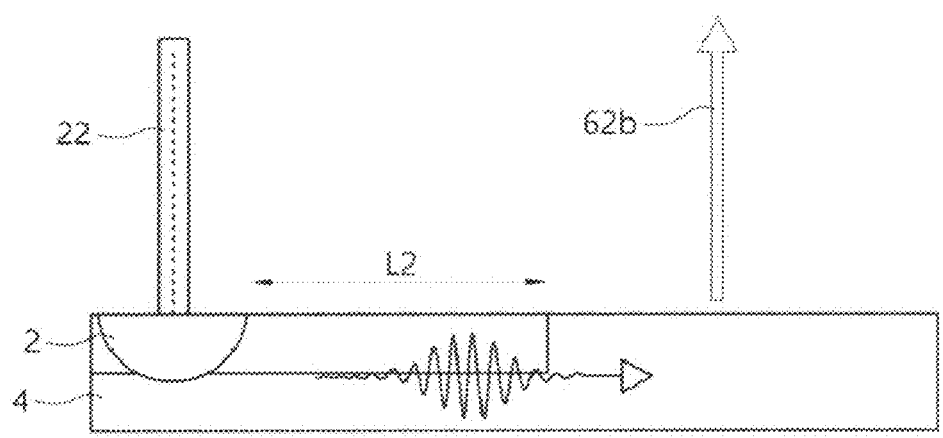
FIG. 5 is a diagram showing another example configuration of the printing laser beam and the femtosecond laser beam when the pitch-catch technique is used in the 3D printing system according to an example embodiment of the present disclosure.

FIG. 5 is a diagram illustrating a configuration of another example of the printing laser beam and the femtosecond laser beam when the pitch-catch technique is used in the 3D printing system according to an embodiment of the present disclosure.

As another example of the pitch-catch technique, the 3D printing system 1 may not use the pump laser beam 62a. That is, the printing object 4 may be excited using the printing laser beam 22 instead of the pump laser beam 62a to generate ultrasonic waves.

In this case, the probe laser beam 62b may be irradiated onto a spot of the printing object 4 which is spaced apart from the printing laser beam 22 by a predetermined distance L2. As an example, the probe laser beam 62b may be irradiated onto the solidified area of the printing object 4. Here, the probe laser beam 62b may be used for measuring ultrasonic waves so that the state of the printing object 4 can be inspected.

According to the embodiments of the present disclosure described as above, the measurement for detecting defects and estimating physical properties can be performed in high resolution during the 3D printing process. Thus, the efficiency of the 3D printing process can be improved by discarding any defected product early during the process when any printing object with defect is detected. In addition, a feedback control can be done in real-time, thereby improving product quality.

Figure 6:
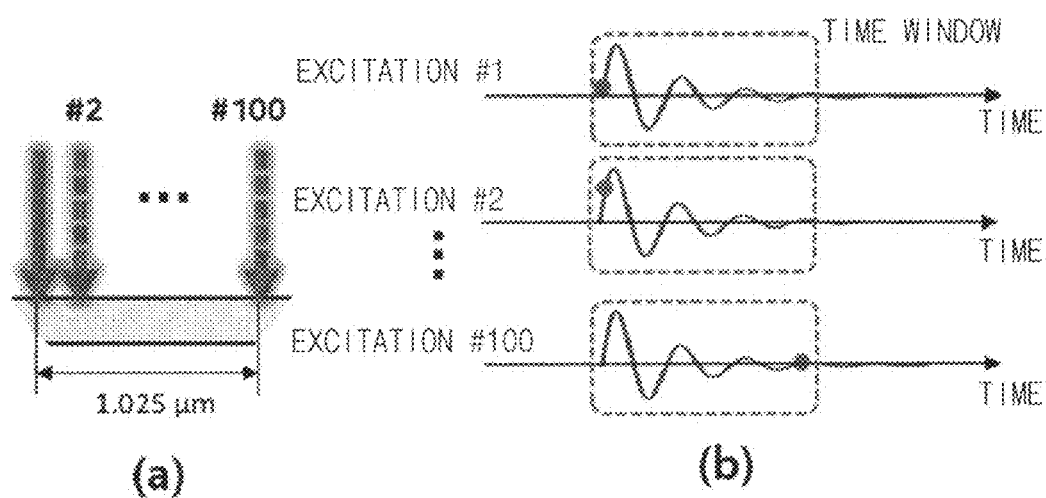
FIG. 6 is a view for describing the measurement of a moving printing object in the 3D printing system according to an example embodiment of the present disclosure.

FIG. 6 is a diagram for describing measurement of a moving printing object in the 3D printing system according to an embodiment of the present disclosure.

The pulse duration of the femtosecond laser beam 62 is very short. For example, when the maximum repetition rate of the femtosecond laser beam 62 is, for example, 40 MHz and the scan speed of the 3D printing system 1 is, for example, 10 mm/s, the pulse interval is 0.25 nm as shown in the following equation.

$$\frac{1}{40} \times 10^{-6} \text{ s} \times 10 \text{ mm/s} = 0.25 \text{ nm} \qquad (3)$$

Here, in the case of the piezoelectric-based delay line in the 3D printing system 1, the time taken to move to the next delay line position is approximately 1 μs.

The time required to measure, for example, 100 samples in the time window of the 3D printing system 1 is 102.5 μs as shown in the following equation.

$$\left(1 \text{ μs} + 102.5 \frac{1}{40} \times 10^{-6} \text{ s}\right) \times 100 = 102.5 \text{ μs} \qquad (4)$$

Accordingly, the 3D printing system 1 may move 1.025 μm as shown in the following equation, while the femtosecond laser beam 62 moves during the measurement time required.

$$102.5 \text{ μs} \times 100 \text{ mm/s} = 1.025 \text{ μm} \qquad (5)$$

As shown in FIG. 6, under the assumption that the average physical properties and characteristic values are estimated in the 1.025 μm section, the measurement signal may be used to estimate physical properties such as the average elastic modulus of the target section and the thickness of the printing object 4.

Accordingly, the ultrasonic measurement using the femtosecond laser beam 62 can ignore the influence of movement of the printing object 4 compared to the conventional laser-based measurement techniques.

Figure 7:
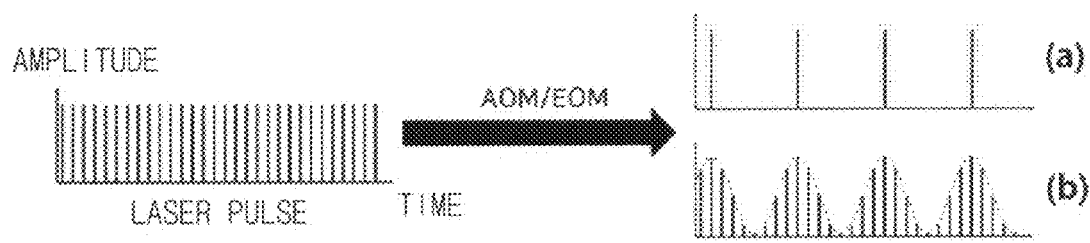
FIG. 7 is a diagram for describing modulation of the femtosecond laser beam in the 3D printing system according to an example embodiment of the present disclosure.
Figure 8:
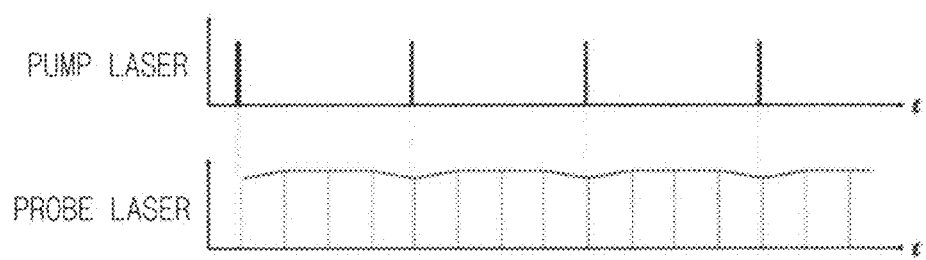
FIG. 8 is a diagram showing the pump laser beam and the probe laser beam shown in FIG. 7.

FIG. 7 is a diagram for describing modulation of the femtosecond laser beam in the 3D printing system according to an embodiment of the present disclosure, and FIG. 8 is a view showing the pump laser beam and the probe laser beam in FIG. 7.

In the case of using the femtosecond laser beam, the measured effective signal may be greatly influenced by environmental noises because the signal strength is relatively small. To minimize the influence due to the noises, an example embodiment of the present disclosure modulates the pump laser beam 62a by an acousto-optic modulator (AOM) or an electro-optic modulator (EOM), so that a signal can be transmitted at a predetermined frequency. At this time, the signal can be effectively measured by the lock-in amplifier 90.

As shown in FIG. 7, by the AOM or EOM, the laser pulse may be (a) pulse-peaked or (b) pulse-modulated. The pump laser beam 62a modulated in this way may allow useful ultrasonic information to be transmitted through a carrier frequency.

As shown in FIG. 8, the pump laser beam 62a may be pulse-peaked. Here, the pulse peaking rate may be the modulation frequency $f_0$. The probe laser beam 62b reflected by the printing object 4 may have a shorter pulse interval than the pump laser beam 62a.

Figure 9:
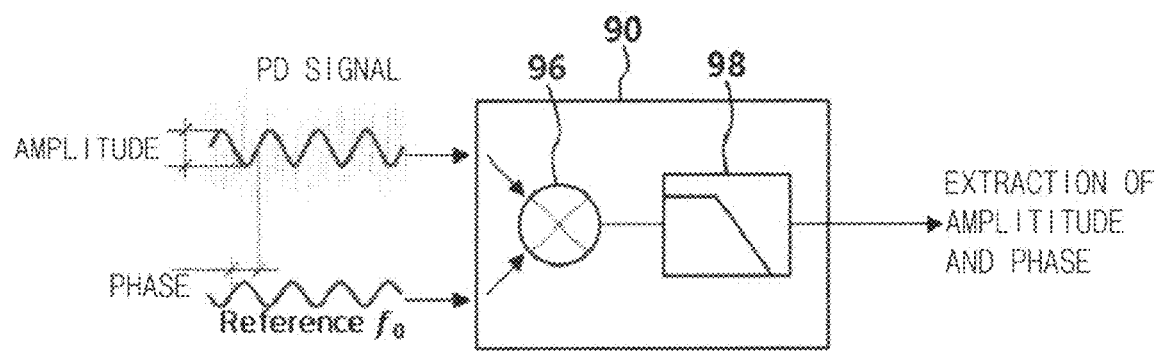
FIG. 9 illustrates a block diagram showing a detailed configuration of the lock-in amplifier shown FIG. 1.

FIG. 9 illustrates a detailed configuration of the lock-in amplifier shown in FIG. 1.

The lock-in amplifier 90 can demodulate amplitude and phase information from a response signal even in an environment of extreme noises. Referring to FIG. 9, the lock-in amplifier 90 may include a demodulator 96 and a low pass filter 98.

The lock-in amplifier 90 may receive an output signal (a PD signal) of the photo detector 92 as an input signal, and a reference signal of a modulation frequency $f_0$. The reference signal may have a phase difference from the PD signal corresponding to a time delay between the pump laser beam 62a and the probe laser beam 62b.

The demodulator 96 may demodulate the output signal (PD signal) of the photo detector 92 with the reference signal of $f_0$.

The low pass filter 98 may pass a low frequency band of a signal demodulated by the demodulator 96. The low pass filter 98 may remove noise in a high frequency band. Accordingly, the lock-in amplifier 90 may extract accurate amplitude and phase information of the detected signal.

With such a configuration, the femtosecond laser-based ultrasonic measuring apparatus for the 3D printing process and the 3D printing system equipped with the same according to the embodiments of the present disclosure can perform the measurements for product defect detection and material property estimation in real time with high spatial measurement resolution. Therefore, it is possible to improve the control precision and quality of the 3D printing process.

In addition, since the present disclosure can perform on-line defect detection and physical property estimation during the 3D printing process, it is possible to provide real-time feedback control for early disposal during the 3D printing process or to improve product quality. Therefore, it is possible to improve the efficiency of the 3D printing process.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A three dimensional (3D) printing system with a function of femtosecond laser-based ultrasonic measurement, comprising:
    a base material source for supplying a base material for 3D printing;
    a nozzle arranged to feed the base material from the base material source to a printing object;
    a 3D printing laser source for irradiating a printing laser beam to molt the base material, thereby forming a molten pool on the printing object;
    a femtosecond laser source disposed coaxially with the 3D printing laser source, and configured to irradiate a femtosecond laser beam to inspect a state of the printing object formed by melting the base material using the 3D printing laser beam;
    a first beam splitter configured to separate the femtosecond laser beam from the femtosecond laser source into a first femtosecond laser beam and a second femtosecond laser beam;
    an electric/acoustic optical modulator configured to modulate the first femtosecond laser beam, at a predetermined modulation frequency in a pulse picking method, into a pump laser beam;
    a time delay unit configured to delay the second femtosecond laser beam in time to be a probe laser beam with a time delay by guiding the second femtosecond laser beam to pass through an adjusted length of optical path;
    a photo detector configured to detect the probe laser beam reflected from the printing object and convert the detected probe laser beam into an electrical signal; and
    a lock-in amplifier configured to detect an amplitude and a phase of the output signal from the photo detector, wherein the lock-in amplifier includes a demodulator for demodulating an output signal from the photo detector at the modulation frequency, and a low pass filter for passing a low frequency band of the demodulated signal,
    a reflection mirror unit including a plurality of reflection mirrors for changing optical paths of the printing laser beam, the pump laser beam, and the probe laser beam to be arranged coaxially;
    a second beam splitter, disposed on a coaxial path of the printing laser beam, the pump laser beam, and the probe laser beam, allowing the printing laser beam, the pump laser beam, and the probe laser beam to pass toward the printing object through the nozzle, and reflecting the probe laser beam incident on and then reflected from the printing object toward the photo detector; and
    a focus lens for focusing the printing laser beam from the reflection mirror unit onto the printing object,
    wherein the detected amplitude and phase are used for estimating physical properties of the printing object and detecting defects of the printing object,
    wherein the pump laser beam is to generate ultrasonic waves by causing the printing object to be excited, and the probe laser beam is to measure ultrasonic waves to inspect a state of the printing object, and
    wherein the probe laser beam reflected by the printing object has a shorter pulse interval than the pump laser beam.

2. The 3D printing system of claim 1, wherein the pump laser beam and the probe laser beam are irradiated to be incident on a solidified area spaced apart from the printing laser beam by a predetermined distance.

3. The 3D printing system of claim 2, wherein the pump laser beam and the probe laser beam are irradiated to be incident on a same spot of the printing object.

4. The 3D printing system of claim 1, wherein the pump laser beam is irradiated to be incident on a same position as the printing laser beam, and the probe laser beam is irradiated to be incident on a solidified area spaced apart from the printing laser beam by a predetermined distance.

5. The 3D printing system of claim 1, wherein the probe laser beam is irradiated to be incident on a solidified area spaced apart from the printing laser beam by a predetermined distance, and the printing laser beam is used as the pump laser beam.

6. The 3D printing system of claim 1, wherein a minimum displacement of the length is 0.11 μm.

7. The 3D printing system of claim 1, wherein the femtosecond laser source generates the femtosecond laser beam at a frequency of 40 MHz.

8. The 3D printing system of claim 1, wherein the physical property includes at least any one of Young's modulus and residual stress, and the defect includes at least any one of crack, void, and porosity.

9. The 3D printing system of claim 1, wherein the pump laser beam, the probe laser beam, and the printing laser beam have different wavelengths.

10. The 3D printing system of claim 9, wherein the printing laser beam has a wavelength band of 1.07 μm or less.

11. The 3D printing system of claim 9, wherein the probe laser beam has a wavelength band of 515 nm or less.

12. The 3D printing system of claim 9, wherein the pump laser beam has a wavelength band of 257 nm or less.

13. The 3D printing system of claim 1, wherein the reflection mirror unit comprises a first reflection mirror configured to reflect the printing laser beam from the 3D printing laser source toward the femtosecond laser source; and a second reflection mirror configured to reflect the reflected printing laser beam toward the printing object.

\* \* \* \* \*